United States Patent
McVeigh

(10) Patent No.: US 6,348,949 B1
(45) Date of Patent: Feb. 19, 2002

(54) DEINTERLACING A VIDEO SIGNAL USING A MOTION DETECTOR

(75) Inventor: Jeffrey S. McVeigh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/219,740

(22) Filed: Dec. 22, 1998

(51) Int. Cl.[7] .............................................. H04N 11/20
(52) U.S. Cl. ...................................... 348/452; 348/448
(58) Field of Search ................................. 348/452, 448, 348/458, 700

(56) References Cited

U.S. PATENT DOCUMENTS

| | | | | |
|---|---|---|---|---|
| 4,635,114 A | * | 1/1987 | Wendland et al. | 348/452 |
| 4,897,716 A | * | 1/1990 | Drewery et al. | 348/452 |
| 4,967,271 A | * | 10/1990 | Campbell et al. | 348/452 |
| 4,992,869 A | * | 2/1991 | Samad | 358/140 |
| 5,095,354 A | * | 3/1992 | Sokawa et al. | 348/452 |
| 5,347,308 A | * | 9/1994 | Wai | 348/394 |
| 5,410,356 A | * | 4/1995 | Kikuchi et al. | 348/452 |
| 5,475,438 A | * | 12/1995 | Bretl | 348/452 |
| 5,532,751 A | | 7/1996 | Lui | 348/452 |
| 5,579,054 A | * | 11/1996 | Sezan et al. | 348/452 |
| 5,671,018 A | * | 9/1997 | Ohara et al. | 348/452 |
| 5,793,435 A | * | 8/1998 | Ward et al. | 348/448 |
| 5,825,429 A | * | 10/1998 | Shirahata | 348/452 |
| 5,917,554 A | * | 6/1999 | Ohta | 348/581 |
| 6,034,734 A | * | 3/2000 | De Haan et al. | 348/458 |

* cited by examiner

*Primary Examiner*—Victor R. Kostak
(74) *Attorney, Agent, or Firm*—Schwegmann, Lundberg, Woessner & Kluth, P.A.

(57) ABSTRACT

Deinterlacing a video signal using a motion detector is disclosed. In one embodiment, a divider, a comparator, and an interpolator deinterlace a video signal and reduce combing artifacts. The divider forms a ratio of inter-field activity to intra-field activity in a video frame. The ratio is compared to an empirically determined threshold. If the ratio is greater than the threshold, then there is motion in the frame and the second field is interpolated from the first field. If the ratio is less than the threshold, then there is no motion in the frame and no change is made to the frame.

10 Claims, 3 Drawing Sheets

DEINTERLACING A VIDEO SIGNAL USING A MOTION DETECTOR

FIELD OF THE INVENTION

This invention relates to video signal processing, and, more particularly, to deinterlacing a video signal.

BACKGROUND OF THE INVENTION

Personal computers, along with their monitors, are used in nearly every field of work. Many fields also make use of microprocessors for encoding and decoding video signals. For example, in the medical field, a surgeon working at a large university medical center consults on a surgical procedure taking place in a remote clinic. The surgical procedure being performed in the remote clinic is captured using a video camera and transmitted to a personal computer in the university medical center for real time display and viewing by the surgeon.

A problem that occurs in the scenario described above is that the displayed video often contains defects known as artifacts. Some artifacts occur as a result of a mismatch between the rate at which information is acquired during the interlaced encoding process and the rate at which it is displayed on a progressive monitor, such as a personal computer monitor, during the decoding and display process.

An interlaced video frame contains two fields. The first field consists of the odd lines in the interlaced video frame and the second field consists of the even lines in the interlaced video frame. When displayed on an interlaced video system, the lines of the two fields are displayed in an alternating fashion. All odd lines of the interlaced video frame are displayed, and one-sixtieth of a second later, all even lines of the interlaced video frame are displayed.

In a system that displays an interlaced video signal on a progressive monitor, the two fields of the frame are combined and displayed at a rate of one-thirtieth of a second per frame. Combining the two fields captured every one-sixtieth of a second and then displaying the combined fields at a rate of one thirtieth of a second results in combing artifacts in areas of the displayed video that contain motion. These artifacts blur the edges of moving objects, which in the example described above can create a significant problem for the consulting physician in that critical areas of the displayed video can appear blurred.

One solution to this problem is to use motion compensated interpolation during the encoding and decoding of the video signal to reduce the blurring introduced by the combing artifacts. Motion compensated interpolation creates a missing block in a video frame by averaging over the immediately previous and following blocks that are available to the decoder. Unfortunately, this solution is computationally complex and requires a large amount of memory and a powerful processor to implement.

For these and other reasons there is a need for the present invention.

SUMMARY OF THE INVENTION

A system for deinterlacing a video signal is described. In one embodiment of the present invention, a detector identifies regions in a video signal that contain inter-field motion. An interpolator is coupled to the motion detector and is capable of generating an interpolated value, when the motion is detected.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1:
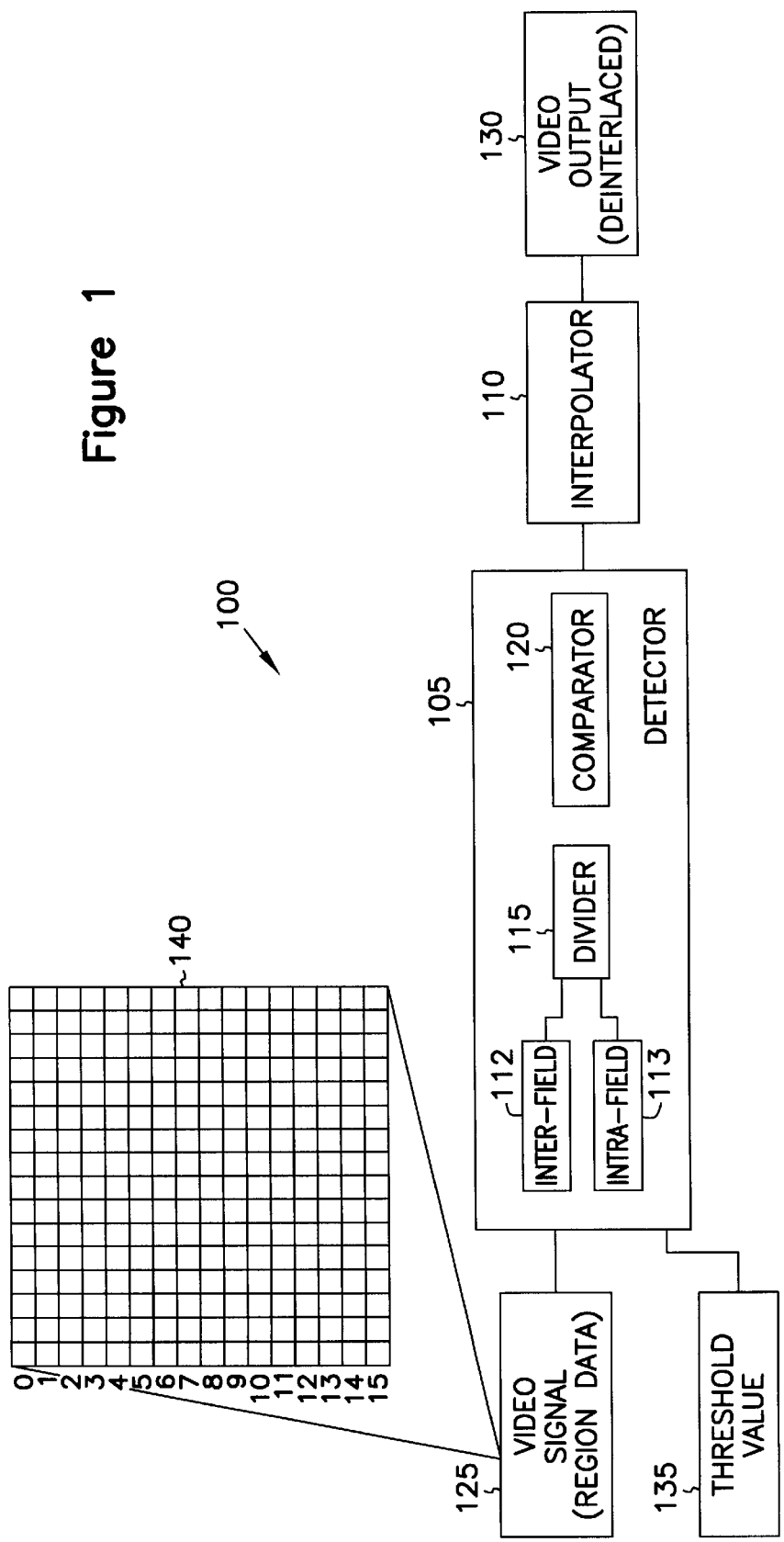
FIG. 1 is a block diagram of an embodiment of a system of the present invention.

FIG. 1 shows a block diagram of one embodiment of video deinterlacing system 100. System 100 comprises detector 105 and interpolator 110. Detector 105 comprises inter-field estimator 112, intra-field estimator 113, divider 115, and comparator 120. Region data 125 is an input to detector 105; the output of detector 105 is an input to interpolator 110; and the output of interpolator 110 is deinterlaced video output signal 130. Threshold value 135 is an input to detector 105. The input port of comparator 120 receives the output signal from divider 115, and the input port of divider 115 receives the output signal from inter-field estimator 112 and intra-field estimator 113.

Region map 140 is a diagram of a detailed layout of one embodiment of region data 125. Region data 125 of a video signal is a set of pixels in a video frame. A frame can be made up of multiple regions, and region data 125, which is one region of a video frame, is not limited to any particular shape. For example, the outline of a set of pixels that form region data 125 can be a polygon, a circle, or an ellipse. In one embodiment, region map 140 represents a sixteen-by-sixteen block of pixels containing sixteen rows of interleaved field data for an interlaced video signal. The even numbered rows represent rows of pixels for a first field and the odd numbered rows represent rows of pixels for a second field. In an alternate embodiment, region data 125 is any set of pixels in a frame.

Detector 105 receives and processes region data 125 in order to determine whether motion exists in region data 125.

Divider 115 forms a ratio of a measure of inter-field activity to a measure of intra-field activity. Inter-field activity is the activity between the two fields of an interlaced video signal whose lines are displayed in an alternating fashion. Intra-field activity is the activity between the lines of one of the two fields of an interlaced video signal. Inter-field activity and intra-field activity are measured with respect to a region in an interlaced video frame. In one embodiment, inter-field estimator 112 and intra-field estimator 113 measure the inter-field activity and the intra-field activity, respectively, by estimating the activity within a region in an interlaced video frame. Estimating the activity is not limited to any particular method of estimating. In one embodiment, the inter-field activity is measured by estimating the inter-field activity by calculating the sum of the sum-of-absolute-differences (SAD) between successive lines in the region data 125. The intra-field activity is measured by estimating the intra-field activity by calculating the sum of the sum-of-absolute-differences (SAD) between every other line in the region. The estimate of intra-field activity acts to normalize the inter-field activity in a ratio of inter-field activity to intra-field activity.

Comparator 120 compares the output of divider 115 to threshold value 135 in order to determine whether the ratio of the estimate of the inter-field activity to the estimate of the intra-filed activity is greater than the threshold. Threshold value 135 is determined empirically through an iterative process. A threshold is selected, interlaced video is processed and displayed on a progressive monitor using the selected threshold, the displayed video is viewed, and the threshold is adjusted to reduce the combing artifacts observed during viewing.

Divider 115 in combination with comparator 120, in one embodiment, functions a as a motion detector with respect to region data 125. In one embodiment, a high value at the output of comparator 120 indicates the presence of inter-field motion, and a low value indicates the absence of inter-field motion. An advantage flows from an embodiment that uses a motion detector to discriminate between regions of an interlaced video frame that contain motion and regions of an interlaced video frame that do not contain motion. The advantage is that high vertical frequency information in stationary regions of the frame is retained, while combing artifacts in regions exhibiting motion are reduced. This occurs since interpolation is applied to region data 125 in which the output of comparator 120 indicates the presence of inter-field motion, while interpolation is not applied to region data 125 in which the output of comparator 120 indicates the absence of inter-field motion. In this embodiment interpolation is not performed in the absence of inter-field motion. Other methods, such as spatial interpolation, do not retain high vertical frequency information in stationary regions of a frame while reducing the effect of combing artifacts.

Interpolator 110 reduces the effect of combing artifacts in deinterlaced video output signal 130 by interpolating the second field from the first field, when the ratio is greater than the threshold. In one embodiment, each line of field one is interpolated by averaging the pixel values of the adjacent lines of field two. For example, if motion exists in region data 125, then region data 125 is modified by interpolator 110 in order to remove interlaced artifacts prior to displaying the region data. In this example, in region data 125 the value of each pixel of each line of field two is obtained by averaging the values of the two pixels in the adjacent lines of field one.

Those skilled in the art will recognize that because of the duality that exists between digital hardware and software, software designs can be implemented in hardware and hardware designs can be implemented in software. For example, detector 105, inter-field estimator 112, intra-field estimator 113, divider 115, comparator 120, and interpolator 110 can be implemented in one embodiment in hardware, such as in electronic circuits. Alternatively, detector 105, inter-field estimator 112, intra-field estimator 113, divider 115, comparator 120, and interpolator 110 can be implemented in another embodiment in software.

An advantage of an embodiment that combines detector 105 and interpolator 110 is that when implemented in a microprocessor system the system exhibits good cache utilization. Good cache utilization is achieved because this embodiment processes one video frame at a time rather than three or more video frames as processed in motion compensation systems. When processing three or more frames, cache thrashing is common, since localized pixel data is swapped out of the cache when other data is required by the processor.

Another advantage of this embodiment is that it has very low computational complexity when compared to deinterlacing techniques based on motion compensation. Predicting the motion between two fields, which is required in motion compensation systems, is typically a complex and computationally intensive procedure. In this embodiment, calculations are summations and the data can be arranged as vectors for low complexity parallel processing. Low computational complexity makes this embodiment of the present invention easy to develop, debug, install, and maintain, which greatly lowers the lifetime costs of the system.

In one embodiment, deinterlacing a video signal is accomplished by establishing a threshold value, developing a measurement of inter-field activity, developing a measurement of intra-field activity, dividing the inter-field activity by the intra-field activity to obtain a ratio, comparing the ratio to a threshold, and interpolating a second field from the first field, if the ratio exceeds the threshold. The measurements are used to classify regions as either containing inter-field motion or not containing inter-field motion. In one embodiment, the measurements may be estimates of inter-field activity and estimates intra-field activity. If the ratio is less than the threshold, it is assumed that there is little or no motion between the fields in the region and thus no interlaced artifacts, and the region data is left unchanged. If the ratio is greater than the threshold, it is assumed that interlaced artifacts are present in the region, and the second field is interpolated from the first field by averaging to remove the artifacts.

Figure 2:
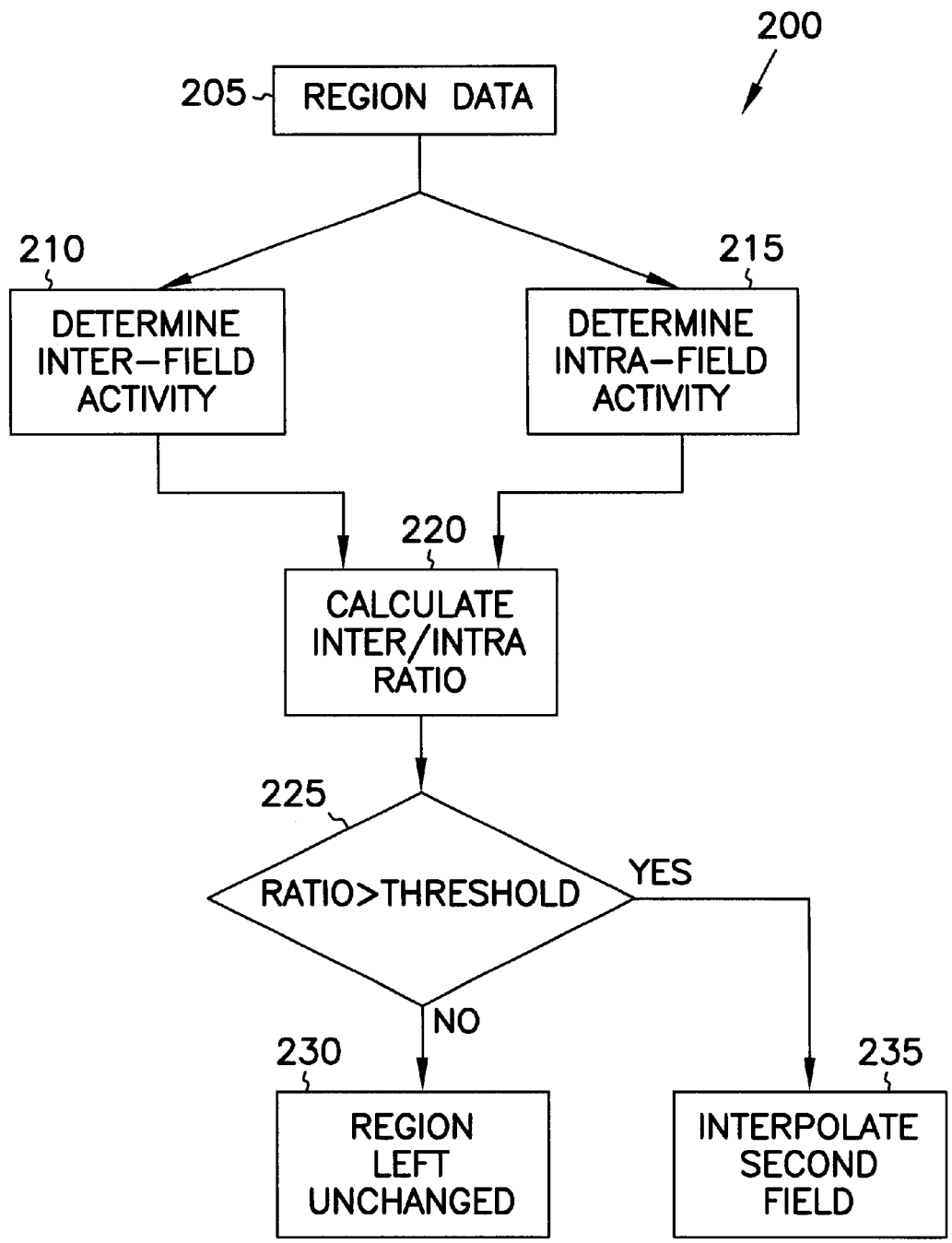
FIG. 2 is a flow diagram of an embodiment of a method of the present invention.

Referring to FIG. 2, flow diagram 200 of one embodiment of a method of the present invention is shown. Region data 205 is processed at block 210 and block 215 to determine the amount of inter-field activity and the amount of intra-field activity, respectively. At block 220, a measure of inter-field activity from block 210 and a measure of intra-field activity from block 215 is received. At block 220, a ratio of inter-field activity to intra-field activity is calculated. At decision block 225, the ratio generated at block 220 is compared to a threshold. Deriving a new second field from a first field, such as by interpolation of the first field to create the new second field, occurs at block 235, if the ratio generated at block 220 is identified as being greater than the threshold at decision block 225. The region data provided at block 205 is left unchanged in block 230, if the ratio generated at block 220 is identified as being not greater than the threshold at decision block 225.

Figure 3:
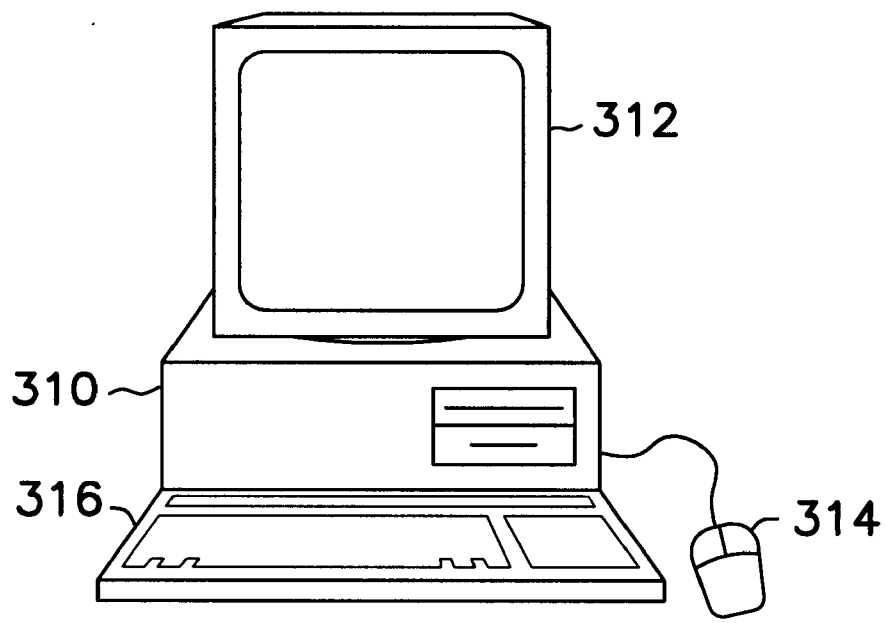
FIG. 3 is a diagram of a computer in conjunction with which embodiments of the invention may be practiced.

A representative computer, in conjunction with which embodiments of the invention may be practiced, is now described. Those of ordinary skill within the art can appreciate, however, that the invention is not limited to implementation in conjunction with this computer. Referring to FIG. 3, a diagram of the computer in conjunction with which embodiments of the invention may be practiced is shown. Computer 310 is operatively coupled to monitor 312, pointing device 314, and keyboard 316. Computer 310 includes a processor, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interfaces. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A system for deinterlacing a video signal comprising:
    a detector comprising:
        a divider capable of forming a ratio; and
        a comparator coupled to the divider and capable of comparing a threshold value to the ratio; and
    an interpolator directly coupled to the detector and capable of generating an interpolated value, when the detector identifies motion in the video signal.

2. The system of claim 1, wherein the ratio comprises:
    a measure of inter-field activity divided by a measure of intra-field activity in a region having lines of an interlaced video signal.

3. The system of claim 2, wherein the measure of inter-field activity comprises:
    an estimate.

4. The system of claim 2, wherein the measure of intra-field activity comprises:
    an estimate.

5. A method for identifying motion in a video signal comprising:
    deriving a measure of activity from the video signal;
    comparing the measure to a threshold value in order to identify motion in the video signal; and
    deinterlacing the video signal, wherein deriving a measure of activity from the video signal comprises deriving the measure from an estimate of inter-field activity and intra-field activity, and deriving the measure from an estimate of inter-field activity and intra-field activity comprises computing a ratio of inter-field activity to intra-field activity.

6. A method for deinterlacing a video signal having a first field, a second field, and a region, the method comprising:
    determining whether motion exists in the region comprising:
        deriving a measure of activity from the region; and
        comparing the measure to a threshold value; and
    modifying the region when motion exists in the region, wherein deriving a measure of activity from the region comprises deriving the measure from an estimate of inter-field activity and intra-field activity, and deriving the measure from an estimate of inter-field activity and intra-field activity comprises computing a ratio of inter-field activity to intra-field activity.

7. A method of modifying a video signal having a first field and a second field, the method comprising:
    determining inter-field activity in a region;
    determining intra-field activity in the region;
    computing a ratio of the inter-field activity to the intra-field activity;
    comparing the ratio to a threshold; and
    deriving the second field from the first field when the ratio is greater than the threshold.

8. The method of claim 7, wherein determining inter-field activity in the region comprises:
    estimating inter-field activity in the region.

9. The method of claim 7, where determining intra-field activity in the region comprises:
    estimating intra-field activity in the region.

10. A computer program product, comprising:
    a program storage device readable by a digital processing apparatus; and
    a program of instructions tangibly embodied on the program storage device and executable by the digital processing apparatus to perform a method of modifying a video signal having a first field and a second field, the method comprising:
    determining inter-field activity in the region;
    determining intra-field activity in the region;
    computing a ratio of the inter-field activity to the intra-field activity;
    comparing the ratio to a threshold; and
    deriving the second field from the first field when the ratio is greater than the threshold.

* * * * *